US008309497B1

(12) United States Patent
Zhang

(10) Patent No.: US 8,309,497 B1
(45) Date of Patent: Nov. 13, 2012

(54) HIGH PERFORMANCE DRILLING FLUIDS WITH SUBMICRON-SIZE PARTICLES AS THE WEIGHTING AGENT

(75) Inventor: Ying Zhang, Sugarland, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 13/534,347

(22) Filed: Jun. 27, 2012

Related U.S. Application Data

(60) Division of application No. 12/409,240, filed on Mar. 23, 2009, now Pat. No. 8,252,729, which is a continuation-in-part of application No. 12/015,696, filed on Jan. 17, 2008.

(51) Int. Cl.
*C09K 8/00* (2006.01)
(52) U.S. Cl. ........ 507/140; 507/116; 507/117; 507/138; 507/139; 166/305.1
(58) Field of Classification Search .................. 507/116, 507/117, 138, 139, 140; 166/305.1
See application file for complete search history.

(56) References Cited

U.S. PATENT DOCUMENTS

| | | | | |
|---|---|---|---|---|
| 6,586,372 B1 * | 7/2003 | Bradbury et al. | ............. | 507/140 |
| 2010/0009874 A1 * | 1/2010 | Ballard et al. | ................ | 507/118 |

* cited by examiner

*Primary Examiner* — Alicia Toscano
(74) *Attorney, Agent, or Firm* — Craig W. Roddy; McDermott Will & Emery LLP

(57) ABSTRACT

Drilling fluids comprising a carrier fluid; a weighting agent that comprises sub-micron precipitated barite; a particle having a specific gravity of greater than about 2.6; and, a bridging agent that is not the submicron-precipitated barite or the particle. The weighting agent has a particle size distribution such that at least 10% of particles in the sub-micron precipitated barite have a diameter below about 0.2 microns, at least 50% of the particles in the sub-micron precipitated barite have a diameter below about 0.3 microns and at least 90% of the particles in the sub-micron precipitated barite have a diameter below about 0.5 microns. The particle has a specific gravity of greater than about 2.6 is not sub-micron precipitated barite. The ratio of the sub-micron precipitated barite to the particle is about 10:90 to about 99:1. The bridging agent comprises a degradable material.

27 Claims, 1 Drawing Sheet

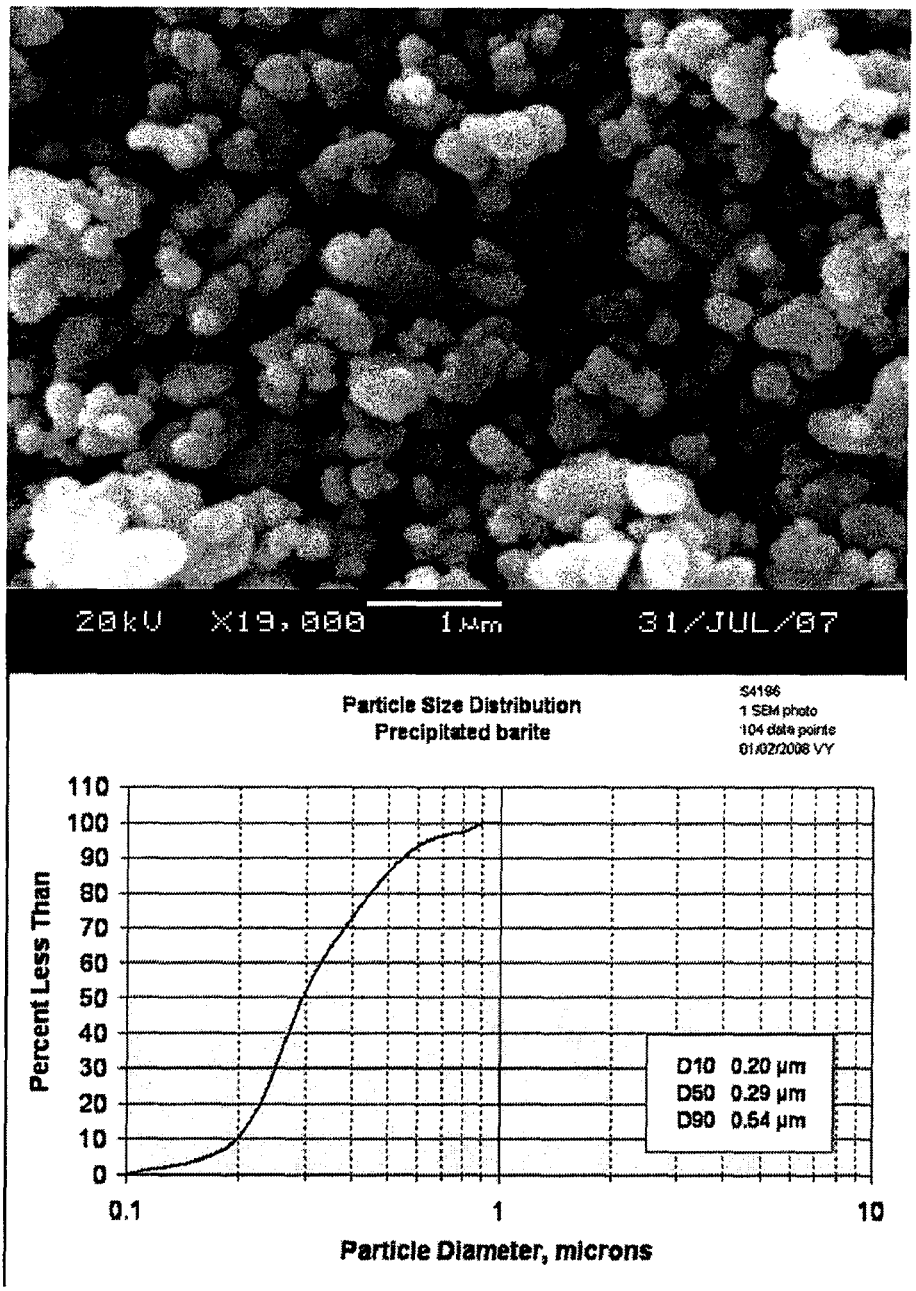

HIGH PERFORMANCE DRILLING FLUIDS WITH SUBMICRON-SIZE PARTICLES AS THE WEIGHTING AGENT

CROSS-REFERENCES TO RELATED APPLICATIONS

This application is a divisional of U.S. patent application Ser. No. 12/409,240 by Ying Zhang, filed on Mar. 23, 2009, entitled "High Performance Drilling Fluids with Submicron-Size Particles as the Weighting Agent," and published as US 2009/0192052, the entire disclosure of which incorporated by reference, which was itself a continuation-in-part of U.S. patent application Ser. No. 12/015,696 filed on Jan. 17, 2008, and published as US 2009/0186781, the entire disclosure of which is incorporated by reference.

BACKGROUND

The present invention relates to compositions and methods for drilling well bores in subterranean formations. More particularly, in certain embodiments, the present invention relates to drilling fluids with a weighting agent that comprises sub-micron precipitated barite.

Natural resources such as oil or gas residing in a subterranean formation can be recovered by drilling a well bore that penetrates the formation. During the drilling of the well bore, a drilling fluid may be used to, among other things, cool the drill bit, lubricate the rotating drill string to prevent it from sticking to the walls of the well bore, prevent blowouts by serving as a hydrostatic head to the entrance into the well bore of formation fluids, and remove drill cuttings from the well bore. A drilling fluid may be circulated downwardly through a drill pipe and drill bit and then upwardly through the well bore to the surface.

In order to prevent formation fluids from entering the well bore, the hydrostatic pressure of the drilling fluid column in the well bore should be greater than the pressure of the formation fluid. The hydrostatic pressure of the drilling fluid column is a function of the density of the drilling fluid and depth of the well bore. Accordingly, density is an important property of the drilling fluid for preventing the undesirable flow of formation fluids into the well bore. To provide increased density, weighting agents are commonly included in drilling fluids. Weighting agents are typically high-specific gravity, finely ground solid materials. As referred to herein, the term "high-specific gravity" refers to a material having a specific gravity of greater than about 2.6. Examples of suitable weighting agents include, but are not limited to, barite, hematite, ilmentite, manganese tetraoxide, galena, and calcium carbonate.

As well bores are being drilled deeper, the pressure of the formation fluids increases. To counteract this pressure increase and prevent the undesired inflow of formation fluids, a higher concentration of weighting agent may be included in the drilling fluid. However, increasing the concentration of weighting agent may be problematic. For example, as the concentration of the weighting agent increases problems with particle sedimentation may occur (often referred to as "sag"). Among other things, particle sedimentation may result in stuck pipe or a plugged annulus. Particle sedimentation may be particularly problematic in directional drilling techniques, such as horizontal drilling. In addition to particle sedimentation, increasing the concentration of the weighting agent also may undesirably increase the viscosity of the drilling fluid, for instance. While viscosification of the drilling fluid may be desired to suspend drill cuttings and weighting agents therein, excessive viscosity may have adverse effects on equivalent circulating density. For example, an undesirable increase in the equivalent circulating density may result in an undesired increase in pumping requirements for circulation of the drilling fluid in the well bore.

Several techniques have been utilized to prevent undesired particle sedimentation while providing a drilling fluid with desirable rheological properties. For instance, decreasing the particle size of the weighting agent should create finer particles, reducing the tendency of the particles to settle. However, the inclusion of too many particles of a reduced particle size typically causes an undesirable increase in viscosity. Accordingly, the use of particle sizes below 10 microns has typically been avoided. This is evidenced by the API specification for barite as a drilling fluid additive, which limits the % w/w of particles below 6 microns to a 30% w/w maximum to minimize viscosity increase.

One approach to reducing particle size while maintaining desirable rheology involves utilizing particles of a reduced size while avoiding too many particles that are too fine (below about 1 micron). For instance, sized weighting agents have been utilized with a particle size distribution such that at least 90% of the cumulative volume of the measured particle size diameter is approximately between 4 microns and 20 microns, with a weight average particle diameter ("$d_{50}$") of approximately between 1 micron to 6 microns. The sizing process, however, undesirably increases the material and energy costs involved with sized weighting agent. Another approach to reducing particle size while maintaining desirable rheology involves comminuting the weighting agent in the presence of a dispersant to produce particles coated with the dispersant. The weighting agent is comminuted to have a $d_{50}$ below 2 microns to 10 microns. It is reported that the coating on the comminuted particles prevents the undesired viscosity increase that would be expected from use of particles with a reduced size. However, the coating and comminuting processes add undesired complexity and material and energy costs to utilization of the weighting agent.

SUMMARY

The present invention relates to compositions and methods for drilling well bores in subterranean formations. More particularly, in certain embodiments, the present invention relates to drilling fluids with a weighting agent that comprises sub-micron precipitated barite.

One embodiment of the present invention provides a method comprising circulating a drilling fluid in a well bore, wherein the drilling fluid comprises a carrier fluid and a weighting agent that comprises sub-micron precipitated barite having a weight average particle diameter below about 1 micron.

In another embodiment, the present invention provides a method comprising circulating an invert-emulsion drilling fluid past a drill bit in a well bore, wherein the invert-emulsion drilling fluid comprises a weighting agent comprising sub-micron precipitated barite having a weight average particle diameter below about 1 micron.

In yet another embodiment, the present invention provides a drilling fluid comprising a carrier fluid; and a weighting agent that comprises sub-micron precipitated barite having a weight average particle diameter below about 1 micron.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

FIG. 1 illustrates a SEM image and particle size distribution of precipitated barite suitable for use in the present invention.

DESCRIPTION OF PREFERRED EMBODIMENTS

The present invention relates to compositions and methods for drilling well bores in subterranean formations. More particularly, in certain embodiments, the present invention relates to drilling fluids with a weighting agent that comprises sub-micron precipitated barite.

There may be several potential advantages to the methods and compositions of the present invention. Surprisingly, use of a weighting agent comprising sub-micron precipitated barite, in accordance with embodiments of the present invention, may provide a drilling fluid having a desired density without an undesired increase in viscosity. For instance, inclusion of a weighting agent comprising sub-micron precipitated barite may inhibit particle sedimentation, while proper adjustment of the fluid formulation reduces, or even eliminates, the undesirable impact on viscosity or fluid-loss control that would typically be expected from the use of fine particles. Another potential advantage is that inclusion of a weighting agent comprising sub-micron precipitated barite may enhance the emulsion stability of certain drilling fluids. Yet another potential advantage is that sub-micron precipitated barite may be used as a viscosifying agent, in addition to a weighting agent, reducing or eliminating the need for viscosifying agents in the drilling fluid.

In accordance with embodiments of the present invention, a drilling fluid may comprise a carrier fluid and a weighting agent that comprises sub-micron precipitated barite. Optionally, the drilling fluid may also comprise a bridging agent and a surfactant. In general, the drilling fluid may have a density suitable for a particular application. By way of example, the drilling fluid may have a density of greater than about 9 pounds per gallon ("lb/gal"). In certain embodiments, the drilling fluid may have a density of about 9 lb/gal to about 12 lb/gal. In certain embodiments, the drilling fluid may have a density of about 16 lb/gal to about 22 lb/gal.

Carrier fluids suitable for use in the drilling fluids may include any of a variety of fluids suitable for use in a drilling fluid. Examples of suitable carrier fluids include, but are not limited to, aqueous-based fluids (e.g., water, oil-in-water emulsions), oleaginous-based fluids (e.g., invert emulsions). In certain embodiments, the aqueous fluid may be foamed, for example, containing a foaming agent and entrained gas. In certain embodiments, the aqueous-based fluid comprises an aqueous liquid. Examples of suitable oleaginous fluids that may be included in the oleaginous-based fluids include, but are not limited to, α-olefins, internal olefins, alkanes, aromatic solvents, cycloalkanes, liquefied petroleum gas, kerosene, diesel oils, crude oils, gas oils, fuel oils, paraffin oils, mineral oils, low-toxicity mineral oils, olefins, esters, amides, synthetic oils (e.g., polyolefins), polydiorganosiloxanes, siloxanes, organosiloxanes, ethers, acetals, dialkylcarbonates, hydrocarbons, and combinations thereof. In certain embodiments, the oleaginous fluid may comprise an oleaginous liquid.

Generally, the carrier fluid may be present in an amount sufficient to form a pumpable drilling fluid. By way of example, the carrier fluid may be present in the drilling fluid in an amount in the range of from about 20% to about 99.99% by volume of the drilling fluid. One of ordinary skill in the art with the benefit of this disclosure will recognize the appropriate amount of carrier fluid to include within the drilling fluids of the present invention in order to provide a drilling fluid for a particular application.

In addition to the carrier fluid, a weighting agent may also be included in the drilling fluid, in accordance with embodiments of the present invention. The weighting agent may be present in the drilling fluid in an amount sufficient for a particular application. For example, the weighting agent may be included in the drilling fluid to provide a particular density. In certain embodiments, the weighting agent may be present in the drilling fluid in an amount up to about 70% by volume of the drilling fluid (v %) (e.g., about 5%, about 15%, about 20%, about 25%, about 30%, about 35%, about 40%, about 45%, about 50%, about 55%, about 60%, about 65%, etc.). In certain embodiments, the weighting agent may be present in the drilling fluid in an amount of 10 v % to about 40 v %.

In accordance with embodiments of the present invention, the weighting agent may comprise sub-micron precipitated barite. Sub-micron precipitated barite was observed via a scanning electron microscope ("SEM") to be generally more spherical and less angular than API barite. The precipitated barite may be formed in accordance with any suitable method. For example, barium sulfate can be precipitated from a hot, acidic, dilute barium chloride solution by adding dilute sodium sulfate solution. Other techniques for preparing precipitated barite also may be suitable. The sub-micron precipitated barite generally has a $d_{50}$ of less than about 1 micron. In certain embodiments, the sub-micron precipitated barite has a particle size distribution such that at least 90% of the particles have a diameter ("$d_{90}$") below about 1 micron. In certain embodiments, the sub-micron precipitated barite has a particle size distribution such that at least 10% of the particles have a diameter ("$d_{10}$") below about 0.2 micron, 50% of the particles have a diameter ("$d_{50}$") below about 0.3 micron and 90% of the particles have a diameter ("$d_{90}$") below about 0.5 micron. Particle size distributions of the sub-micron precipitated barite were analyzed statistically from a representative SEM image. In certain embodiments, the sub-micron precipitated barite has a particle size distribution of that disclosed in FIG. 1. An example of a suitable sub-micron precipitated barite is "Barium Sulfate Precipitated" available from Guangxi Xiangzhou Lianzhuang Chemical Co. LTD.

Because the particle size of the sub-micron precipitated barite is lower than that for particles typically used as weighting agents, the precipitated barite should be more resistant to settling, thus allowing the inclusion of higher concentrations in a drilling fluid. As noted above, however, inclusion of too many fine particles in a drilling fluid is expected to have an undesirable impact on the fluid's viscosity. Surprisingly, use of a weighting agent comprising sub-micron precipitated barite, in accordance with embodiments of the present invention, may provide a drilling fluid having a desired density without an undesired increase in viscosity. For instance, inclusion of the sub-micron precipitated barite in the weighting agent while properly adjusting the fluid formulation may improve particle sedimentation without the undesirable impact on viscosity or fluid-loss control that would typically be expected from the use of fine particles. In addition, the precipitated barite may improve the emulsion stability of certain drilling fluids. For example, certain weighting agent components (such as manganese tetraoxide) may undesirably impact the stability of water-in-oil emulsions. However, the inclusion of the precipitated barite may counteract this emulsion destabilization creating a more stable, long-term emulsion. It is believed that the precipitated barite enhances the emulsion stability by creating densely populated, ultra-fine emulsion droplets in the invert emulsion for oil-based drilling fluids. Furthermore, in certain embodiments, the sub-micron precipitated barite may be used as a viscosifying agent, in addition to a weighting agent, reducing or eliminating the need for viscosifying agents in the drilling fluid. As conventional viscosifying agents, such as organophilic clay, may have undesirable impacts on fluid stability under extreme high pressure, high temperature ("HPHT") environments, their elimination may produce more stable fluids.

The sub-micron precipitated barite may be present in the weighting agent in an amount sufficient for a particular application. By way of example, the sub-micron precipitated barite may be present in the weighting agent in an amount of about 10% to about 100% by weight (e.g., about 20%, about 30%, about 40%, about 50%, about 60%, about 70%, about 80%, about 90%, etc.). The amount of the sub-micron precipitated barite to include in the weighting agent depends on a number of factors, including the desired particle sedimentation rate, fluid viscosity, density, filtration control and economical considerations.

In certain embodiments, the weighting agent may also optionally comprise a particle having a specific gravity of greater than about 2.6. In certain embodiments, the particle may have a specific gravity of greater than about 4. The high-specific-gravity particle may comprise any of a variety of particles suitable for increasing the density of a drilling fluid. For example, the high-specific-gravity particles may comprise barite, hematite, ilmenite, manganese tetraoxide, galena, and calcium carbonate. Combinations of these particles may also be used. In one embodiment, the high-specific-gravity particle comprises manganese tetraoxide in an amount of greater than 90% by weight of the particle. Examples of high-specific-gravity particles that comprise manganese tetraoxide include MICROMAX™ and MICROMAX FF™ weighting materials, available from Elkem Materials Inc.

The particle having a specific gravity of greater than about 2.6 may be present in the weighting agent in an amount sufficient for a particular application. By way of example, the high-specific-gravity particle barite may be present in the weighting agent in an amount of about 0% to about 90% by weight (e.g., about 10%, about 20%, about 30%, about 40%, about 50%, about 60%, about 70%, about 80%, etc.). The amount of the high-specific-gravity particle to include in the weighting agent depends on a number of factors, including the desired particle sedimentation rate, fluid viscosity, density, filtration control and economical considerations.

The ratio of the sub-micron precipitated barite to the high-specific-gravity particle included in the weighting agent depends, among other things, on cost, the desired properties of the drilling fluid, and the like. In certain embodiment, the sub-micron-precipitated-barite-to-high-specific-gravity-particle ratio may be about 10:90 to about 100:0 (e.g., about 20:80, about 30:70, about 40:60, about 50:50, about 40:60, about 30:70, about 80:20, about 90:10, etc.).

In addition, the drilling fluid may further comprise a viscosifying agent in accordance with embodiments of the present invention. As used herein the term "viscosifying agent" refers to any agent that increases the viscosity of a fluid. By way of example, a viscosifying agent may be used in a drilling fluid to impart a sufficient carrying capacity and/or thixotropy to the drilling fluid, enabling the drilling fluid to transport drill cuttings and/or weighting materials, prevent the undesired settling of the drilling cuttings and/or weighting materials. As mentioned above, the sub-micron precipitated barite may replace viscosifying agents, in accordance with embodiments of the present invention. However, in certain embodiments, the sub-micron precipitated barite may be used in conjunction with a viscosifying agent.

Where present, a variety of different viscosifying agents may be used that are suitable for use in a drilling fluid. Examples of suitable viscosifying agents, include, but are not limited to, clays and clay derivatives, polymeric additives, diatomaceous earth, and polysaccharides such as starches. Combinations of viscosifying agents may also be suitable. The particular viscosifying agent used depends on a number of factors, including the viscosity desired, chemical compatibility with other fluids used in formation of the well bore, and other well bore design concerns.

In addition, a bridging agent may also be included in the drilling fluid, in accordance with embodiments of the present invention. The bridging agent may be present in the drilling fluid in an amount sufficient for a particular application. For example, the bridging agent may be included in the drilling fluid to provide the desired degree of fluid loss control. In certain embodiments, the bridging agent may be present in the drilling fluid in an amount up to about 200 lb/bbl. Generally, the bridging agent may have a particle size in the range of from about 1 micron to about 200 microns. Preferably, the bridging particle size is in the range of from about 1 to about 100 microns but may vary from formation to formation. The particle size used is determined by the pore throat size of the formation.

In accordance with some embodiments of the present invention, the bridging agent is preferably self-degrading or degradable in a suitable clean-up solution (e.g., a mutual solvent, water, an acid solution, etc.). When choosing a particular bridging agent to use, one should be aware of the performance of that bridging agent at the temperature range of the application. Examples of suitable bridging agents include, but are not necessarily limited to, magnesium citrate, calcium citrate, calcium succinate, calcium maleate, calcium tartrate, magnesium tartrate, bismuth citrate, calcium carbonate, sodium chloride and other salts, and the hydrates thereof. Examples of degradable bridging agents may include, but are not necessarily limited to, bridging agents comprising degradable materials such as degradable polymers. The terms "degradation" or "degradable" refer to both the two relatively extreme cases of hydrolytic degradation that the degradable material may undergo, e.g., heterogeneous (or bulk erosion) and homogeneous (or surface erosion), and any stage of degradation in between these two. This degradation can be a result of, inter alia, a chemical or thermal reaction, or a reaction induced by radiation. The terms "polymer" or "polymers" as used herein do not imply any particular degree of polymerization; for instance, oligomers are encompassed within this definition.

A polymer is considered to be "degradable" herein if it is capable of undergoing an irreversible degradation when used in an appropriate applications, e.g., in a well bore. The term "irreversible" as used herein means that the degradable material should degrade in situ but should not recrystallize or reconsolidate in situ after degradation.

Suitable examples of degradable polymers that may be used in accordance with the present invention include, but are not limited to, those described in the publication of Advances in Polymer Science, Vol. 157 entitled "Degradable Aliphatic Polyesters," edited by A. C. Albertsson, pages 1-138. Specific examples include homopolymers, random, block, graft, and star- and hyper-branched aliphatic polyesters. Such suitable polymers may be prepared by polycondensation reactions, ring-opening polymerizations, free radical polymerizations, anionic polymerizations, carbocationic polymerizations, coordinative ring-opening polymerizations, as well as by any other suitable process. Examples of suitable degradable polymers that may be used in conjunction with the methods of this invention include, but are not limited to, aliphatic polyesters; poly(lactides); poly(glycolides); poly(ε-caprolactones); poly(hydroxy ester ethers); poly(hydroxybutyrates); poly(anhydrides); polycarbonates; poly(orthoesters); poly(amino acids); poly(ethylene oxides); poly(phosphazenes); poly ether esters, polyester amides, polyamides, and copolymers or blends of any of these degradable polymers, and derivatives of these degradable polymers. The term "copolymer" as used herein is not limited to the combination of two polymers, but includes any combination of polymers, e.g., terpolymers and the like. As referred to herein, the term "derivative" is defined herein to include any compound that is made from one of the listed compounds, for example, by replacing one atom in the base compound with another atom or group of atoms. Of these suitable polymers, aliphatic polyesters such as poly(lactic acid), poly(anhydrides), poly(orthoesters), and poly(lactide)-co-poly(glycolide) copolymers are preferred. Poly(lactic acid) is especially preferred. Poly(orthoesters) also may be preferred. Other degradable polymers that are subject to hydrolytic degradation also may be suitable. One's choice may depend on the particular application or use and the conditions involved. Other guidelines to consider include the degradation products that result, the time for required for the requisite degree of degradation, and the desired result of the degradation (e.g., voids).

Suitable aliphatic polyesters have the general formula of repeating units shown below:

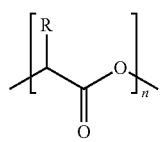

Formula I where n is an integer between 75 and 10,000 and R is selected from the group consisting of hydrogen, alkyl, aryl, alkylaryl, acetyl, heteroatoms, and mixtures thereof. In certain embodiments of the present invention wherein an aliphatic polyester is used, the aliphatic polyester may be poly(lactide). Poly(lactide) is synthesized either from lactic acid by a condensation reaction or, more commonly, by ring-opening polymerization of cyclic lactide monomer. Since both lactic acid and lactide can achieve the same repeating unit, the general term poly(lactic acid) as used herein refers to writ of formula I without any limitation as to how the polymer was made (e.g., from lactides, lactic acid, or oligomers), and without reference to the degree of polymerization or level of plasticization.

The lactide monomer exists generally in three different forms: two stereoisomers (L- and D-lactide) and racemic D,L-lactide (meso-lactide). The oligomers of lactic acid and the oligomers of lactide are defined by the formula:

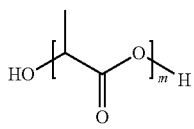

Formula II where m is an integer in the range of from greater than or equal to about 2 to less than or equal to about 75. In certain embodiments, m may be an integer in the range of from greater than or equal to about 2 to less than or equal to about 10. These limits may correspond to number average molecular weights below about 5,400 and below about 720, respectively. The chirality of the lactide units provides a means to adjust, inter alia, degradation rates, as well as physical and mechanical properties. Poly(L-lactide), for instance, is a semicrystalline polymer with a relatively slow hydrolysis rate. This could be desirable in applications or uses of the present invention in which a slower degradation of the degradable material is desired. Poly(D,L-lactide) may be a more amorphous polymer with a resultant faster hydrolysis rate. This may be suitable for other applications or uses in which a more rapid degradation may be appropriate. The stereoisomers of lactic acid may be used individually, or may be combined in accordance with the present invention. Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers can be modified by blending high and low molecular weight polylactide or by blending polylactide with other polyesters. In embodiments wherein polylactide is used as the degradable material, certain preferred embodiments employ a mixture of the D and L stereoisomers, designed so as to provide a desired degradation time and/or rate. Examples of suitable sources of degradable material are poly(lactic acids) that are commercially available from NatureWorks® of Minnetonka, Minn., under the trade names "3001D" and "4060D."

Aliphatic polyesters useful in the present invention may be prepared by substantially any of the conventionally known manufacturing methods such as those described in U.S. Pat. Nos. 6,323,307; 5,216,050; 4,387,769; 3,912,692; and 2,703,316, the relevant disclosures of which are incorporated herein by reference.

Polyanhydrides are another type of degradable polymer that may be suitable for use in the present invention. Examples of suitable polyanhydrides include poly(adipic anhydride), poly(suberic anhydride), poly(sebacic anhydride), and poly(dodecanedioic anhydride). Other suitable examples include, but are not limited to, poly(maleic anhydride) and poly(benzoic anhydride).

The physical properties of degradable polymers may depend on several factors including, but not limited to, the composition of the repeat units, flexibility of the chain, presence of polar groups, molecular mass, degree of branching, crystallinity, and orientation. For example, short chain branches may reduce the degree of crystallinity of polymers while long chain branches may lower the melt viscosity and may impart, inter alia, extensional viscosity with tension-stiffening behavior. The properties of the material utilized further may be tailored by blending, and copolymerizing it with another polymer, or by a change in the macromolecular architecture (e.g., hyper-branched polymers, star-shaped, or dendrimers, and the like). The properties of any such suitable degradable polymers (e.g., hydrophobicity, hydrophilicity, rate of degradation, and the like) can be tailored by introducing select functional groups along the polymer chains. For example, poly(phenyllactide) will degrade at about one-fifth of the rate of racemic poly(lactide) at a pH of 7.4 at 55° C. One of ordinary skill in the art, with the benefit of this disclosure, will be able to determine the appropriate functional groups to introduce to the polymer chains to achieve the desired physical properties of the degradable polymers.

In some embodiments, examples of suitable degradable bridging agents may include degradable materials such as fatty alcohols, fatty esters, fatty acid salts, or derivatives thereof. Fatty alcohols and fatty esters that may be suitable for use in the present invention include, but are not limited to montanyl alcohol (which has a melting point of 83° C. (171° F.); tert-butylhydroquinone (which has a melting point of 128° C. (262° F.), and is insoluble in water); cholesterol (which has a melting point of 149° C. (300° F.), and has a solubility of 0.095 mg/L of water at 30° C. (86° F.)); cholesteryl nonanoate (which has a melting point of about 80° C. (176° F.), and is insoluble in water); benzoin (which has a melting point of about 137° C. (279° F.), and is slightly insoluble in water); borneol (which has a melting point of about 208° C. (406° F.), and is slightly insoluble in water); exo-norborneol (which has a melting point of 125° C. (257° F.) and; glyceraldehyde triphenylmethanol (which has a melting point of 164.2° C. (324° F.), and is insoluble in water; propyl gallate (which has a melting point of 150° C. (302° F.); and dimethyl terephthalate ("DMT") (which has a melting point of 141° C. (286° F.), and limited solubility in water which is more soluble than "slightly"). Suitable fatty alcohols may also include, as examples: camphor ($C_{10}E_{16}O$, with a melting point of about 180° C. (356° F.), slightly soluble in water); cholecalciferol (a.k.a. vitamin D3, $C_{27}H_{440}$, with a melting point of about 85° C. (185° F.), slightly soluble in water); ricinoleyl alcohol ($C_{18}H_{36}O_2$, with a melting point of about 89° C. (192° F.),); 1-Heptacosanol ($C_{27}H_{56}O$, with a melting point of about 82° C. (180° F.),); 1-Tetratriacontanol (a.k.a. geddyl alcohol $C_{34}H_{70}O$, with a melting point of about 92° C. (198° F.),); 1-Dotriacontanol (lacceryl alcohol, $C_{32}H_{66}O$, with a melting point of about 89° C. (192° F.),); 1-Hentriacontanol (melissyl alcohol, $C_{31}H_{64}O$, with a melting point of about 87° C. (189° F.),); 1-Tricontanol (myricyl alcohol, $C_{30}H_{62}O$, with a melting point of about 87° C. (189° F.),); 1-Nonacosanol ($C_{29}H_{60}O$, with a melting point of about 85° C. (185° F.),); 1-Octasanol (a.k.a montanyl alcohol, $C_{28}H_{580}$, with a melting point of about 84° C. (183° F.),); 1-Hexacosanol (ceryl alcohol, $C_{26}H_{540}$, with a melting point of about 81° C. (178° F.),); 1,14-Tetradecanediol ($C_{14}H_{30}O_2$, with a melting point of about 85° C. (185° F.),); 1,16-Hexadecanediol, ($C_{16}H_{34}O_2$, with a melting point of about 91° C. (196° F.),); 1,17-Heptadecanediol, ($C_{18}H_{36}O_2$, with a melting point of about 96° C. (205° F.),); 1,18-Octadecanediol ($C_{19}H_{38}O_2$, with a melting point of about 98° C. (208° F.),); 1,19-Nonadecanediol ($C_{20}H_{40}O_2$, with a melting point of about 101° C. (214° F.),); 1,20-Eicosanediol ($C_{20}H_{42}O_2$, with a melting point of about 102° C. (216° F.),); 1,21-Heneicosanediol ($C_{21}H_{42}O_2$, with a melting point of about 105° C. (221° F.),); and 1,22-Docosanediol ($C_{22}H_{46}O_2$, with a melting point of about 106° C. (223° F.),). Mixtures of these may be suitable as well. These melting points and solubilities are from the HANDBOOK OF AQUEOUS SOLUBILITY DATA, by Samuel H. Yalkowsky and Yan He, Publisher: CRC Press, Copyright: 2003. Fatty acid salts that may be suitable for use in the present invention include, but are not limited to, such fatty acid salts as: sucrose distearate, calcium stearate, glyceryl monostearate, zinc stearate and magnesium stearate which is a hydrophobic substance with a melting point of 88° C. (190° F.).

In addition, a surfactant may also be included in the drilling fluid, in accordance with embodiments of the present invention. Suitable surfactants that may be used may include, but are not limited to, those that can act as wetting agents, surface tension reducers, nonemulsifiers, emulsifiers, formation water wetters, and the like. They may include nonionic, anionic, cationic, amphoteric, and zwitterionic surfactants. Specific examples may include, but are not limited to, alkyl sulfonates, alkyl aryl sulfonates including alkyl benzyl sulfonates such as salts of dodecylbenzene sulfonic acid, alkyl trimethylammonium chloride, branched alkyl ethoxylated alcohols, phenol-formaldehyde nonionic resin blends, cocobetaines, dioctyl sodium sulfosuccinate, imidazolines, alpha olefin sulfonates, linear alkyl ethoxylated alcohols, trialkyl benzylammonium chloride, polyaminated fatty acids, and the like. When used, the surfactant may be included in the concentrate in an amount in the range of from about 0% to about 10% by volume of the solution. In some embodiments, the surfactant may be included in the concentrate in an amount in the range of from about 0% to about 5% by volume of the solution. Substantially any other surfactant that is known to be suitable for use in the treatment of subterranean formations and which does not adversely react with the fluid may be utilized.

The drilling fluids may further comprise additional additives as deemed appropriate by one of ordinary skill in the art, with the benefit of this disclosure. Examples of such additives include, but are not limited to, emulsifiers, wetting agents, dispersing agents, shale inhibitors, pH-control agents, filtration-control agents, lost-circulation materials, alkalinity sources such as lime and calcium hydroxide, salts, or combinations thereof.

One embodiment of the present invention provides a method comprising circulating a drilling fluid in a well bore, wherein the drilling fluid comprises a carrier fluid and a weighting agent that comprises sub-micron precipitated barite having a weight average particle diameter below about 1 micron.

In another embodiment, the present invention provides a method comprising circulating an invert-emulsion drilling fluid past a drill bit in a well bore, wherein the invert-emulsion drilling fluid comprises a weighting agent comprising sub-micron precipitated barite having a weight average particle diameter below about 1 micron In yet another embodiment, the present invention provides a method comprising circulating a drilling fluid in a well bore, wherein the drilling fluid comprises a carrier fluid; and a weighting agent that comprises sub-micron precipitated barite having a particle size distribution such that at least 10% of particles in the sub-micron precipitated barite have a diameter below about 0.2 micron, at least 50% of the particles in the of the sub-micron precipitated barite have a diameter below about 0.3 micron and at least 90% of the particles in the sub-micron precipitated barite have a diameter below about 0.5 micron.

In accordance with embodiments of the present invention, a drilling fluid that comprises a carrier fluid and a weighting agent may be used in drilling a well bore. As set forth above, embodiments of the weighting agent comprise sub-micron precipitated barite. In certain embodiments, a drill bit may be mounted on the end of a drill string that may comprise several sections of drill pipe. The drill bit may be used to extend the well bore, for example, by the application of force and torque to the drill bit. A drilling fluid may be circulated downwardly through the drill pipe, through the drill bit, and upwardly through the annulus between the drill pipe and well bore to the surface. In an embodiment, the drilling fluid may be employed for general drilling of well bore in subterranean formations, for example, through non-producing zones. In another embodiment, the drilling fluid may be designed for drilling through hydrocarbon-bearing zones.

To facilitate a better understanding of the present invention, the following examples of certain aspects of some embodiments are given. In no way should the following examples be read to limit, or define, the entire scope of the invention.

Example 1

For this series of tests, several 17.9 lb/gal (2.14 g/cm³) oil-based drilling fluids were prepared using a mixture of precipitated barite and API barite. The fluid density was obtained from a standard analytical balance. The fluids were mixed with a Hamilton Beach multi-mixer over a 1-hour period. An internal brine phase (250,000 ppm calcium chloride) was emulsified into a continuous oil phase (EDC 99 DW, a hydrogenated mineral oil available from Total Fina Elf). The oil-to-water ratio in the sample fluids was 85/15. The amount of the weighting agents was adjusted according to the desired density of the sample fluids. The mixing ratios of precipitated barite to API barite were 90/10, 70/30 and 50/50 by weight for Sample Fluids #1, #2, and #3, respectively. No organophilic clay was used in these sample fluids. Also included in each sample 6 pounds per barrel of ("lb/bbl") DURATONE® E filtration control agent, available from Halliburton Energy Services, and 5 lb/bbl of a polymeric fluid loss control agent.

Table 1 below shows the viscosity of each sample fluid at various shear rates (in rotations per minute or rpm's), measured with a Fann 35 rheometer at 120° F. Table 1 also includes the result of a high-temperature, high-pressure ("HPHT") filtration test and sag index after static aging at 45° at 400° F. for 120 hours. Filtration was measured with a saturated API HPHT fluid loss cell. The sag index was calculated from $D_b/2D_m$, where $D_b$ is the density of the bottom third of the particular sample fluid after static aging and $D_m$ is the density of the original fluid. A lower sag index indicates better fluid stability against particle sedimentation. The properties of Sample Fluid #3 were measured after static aging for 72 hours.

TABLE 1

| | Viscosity at Various Shear Rates (rpm of agitation): Dial readings of "Fann Units" for: | | | | | | Plastic Viscosity mPa·s | Yield Point lb/100 ft² (Pascals) | Sag Index | Filtration mL |
|---|---|---|---|---|---|---|---|---|---|---|
| | 600 rpm | 300 rpm | 200 rpm | 100 rpm | 6 rpm | 3 rpm | | | | |
| 1 | 165 | 101 | 78 | 53 | 18 | 16 | 64 | 37 | 0.514 | 22 |
| 2 | 104 | 65 | 51 | 34 | 11 | 9 | 39 | 26 | .0543 | 10.4 |
| 3 | 97 | 59 | 45 | 29 | 8 | 7 | 38 | 21 | 0.576 | 6.8 |

From the above example, it can be seen that increasing fraction of precipitated barite enhances the stability against particle sedimentation. The accompanied viscosity increase is still acceptable for most drilling operations. The increasing filtration is due to the narrow size distribution of precipitated barite particles.

Example 2

For this series of tests, several 17.9 lb/gal (2.14 g/cm³) oil-based drilling fluids were prepared using a mixture of precipitated barite and API barite. The fluid density was obtained from a standard analytical balance. The fluids were mixed with a Hamilton Beach multi-mixer over a 1-hour period. An internal brine phase (250,000 ppm calcium chloride) was emulsified into a continuous oil phase (EDC 99 DW, a hydrogenated mineral oil available from Total Fina Elf). The oil-to-water ratio in the sample fluids was 80/20. The amount of the weight agents was adjusted according to the desired density of the sample fluids. The mixing ratios of precipitated barite to API barite were 30/70 and 50/50 by weight for Sample Fluids #4 and #5, respectively. No organophilic clay was used in these sample fluids. Also included in each sample were 8 lb/bbl of DURATONE® E filtration control agent, available from Halliburton Energy Services, and 7 lb/bbl of a polymeric fluid loss control agent.

Table 2 below shows the viscosity of each sample fluid at various shear rates, measured with a Fann 35 rheometer at 120° F. Table 2 also includes the result of a HPHT filtration test and sag index after static aging at 45° at 400° F. for 120 hours. Filtration was measured with a saturated API HPHT fluid loss cell. The sag index was calculated from $D_b/2D_m$, where $D_b$ is the density of the bottom third of the particular sample fluid after static aging and $D_m$ is the density of the original fluid.

From the above example, it can be seen that the increasing amount of precipitated barite in Sample 5 enhances fluid stability against sedimentation with no detrimental effect on viscosity and filtration.

Example 3

For this series of tests, several 17.9 lb/gal (2.14 g/cm³) oil-based drilling fluids were prepared. The fluid density was obtained from a standard analytical balance. The fluids were mixed with a Hamilton Beach multi-mixer over a 1-hour period. An internal brine phase (250,000 ppm calcium chloride) was emulsified into a continuous oil phase (EDC 99 DW, a hydrogenated mineral oil available from Total Fina Elf). The oil-to-water ratio in the sample fluids was 80/20. The amount of the weight agents was adjusted according to the desired density of the sample fluids. Sample Fluid #6 (comparative) used manganese tetraoxide (MICROMAX™ weighting material) as the only weighting material and the total of 5 lb/gal of organophilic clay species as the viscosifier. Sample Fluid #7 used a mixture of precipitated barite and MICROMAX™ weighting material at a mixing ratio of 30/70 by weight. No organophilic clay was used in Fluid #7. Also included in each sample were 8 lb/bbl of DURATONE® E filtration control agent, available from Halliburton Energy Services, and a 7 lb/bbl of a polymeric fluid loss control agent.

Table 2 also includes the result of a HPHT filtration test and sag index after static aging at 45° at 400° F. for 120 hours.

Table 3 below shows the viscosity of each sample fluid at various shear rates, measured with a Farm 35 rheometer at 120° F. Table 2 also includes the result of a HPHT filtration test and sag index after static aging at 45° at 400° F. for 60 hours (Sample Fluid #6) and 120 hours (Sample Fluid #7). Filtration was measured with a saturated API HPHT fluid loss cell. The sag index was calculated from $D_b/2D_m$, where $D_b$ is the density of the bottom third of the particular sample fluid after static aging and $D_m$ is the density of the original fluid.

TABLE 2

| | Viscosity at Various Shear Rates (rpm of agitation): Dial readings of "Fann Units" for: | | | | | | Plastic Viscosity mPa·s | Yield Point lb/100 ft² (Pascals) | Sag Index | Filtration mL |
|---|---|---|---|---|---|---|---|---|---|---|
| | 600 rpm | 300 rpm | 200 rpm | 100 rpm | 6 rpm | 3 rpm | | | | |
| 4 | 121 | 71 | 52 | 32 | 7 | 6 | 50 | 21 | 0.574 | 1.2 |
| 5 | 147 | 90 | 69.5 | 47 | 13 | 10.5 | 57 | 33 | 0.531 | 2.8 |

TABLE 3

| | Viscosity at Various Shear Rates (rpm of agitation): Dial readings of "Fann Units" for: | | | | | | Plastic Viscosity mPa·s | Yield Point lb/100 ft² (Pascals) | Sag Index | Filtration mL |
|---|---|---|---|---|---|---|---|---|---|---|
| | 600 rpm | 300 rpm | 200 rpm | 100 rpm | 6 rpm | 3 rpm | | | | |
| 6 | 117 | 72 | 55 | 36 | 11 | 9 | 45 | 27 | 0.54 | 3 |
| 7 | 105 | 64 | 50 | 33 | 10 | 8.5 | 41 | 23 | 0.519 | 3.4 |

The above example clearly illustrates the benefit of blending precipitated barite in fluids containing MICROMAX™ weighting material with increased anti-sagging stability (lower sag index over longer high temperature static aging duration). Additionally, the preferred low viscosity was maintained in Sample No. 7 without using organophilic clay. The filtration control was satisfying.

Example 4

For this series of tests, several 11 lb/gal oil-based drilling fluids were prepared using precipitated barite. The fluid density was obtained from a standard analytical balance. The fluids were mixed with a Hamilton Beach multi-mixer over a 1-hour period. An internal brine phase (250,000 ppm calcium chloride) was emulsified into a continuous oil phase. The oil-to-water ratio ("OWR") in the sample fluids is indicated in the table below. The amount of the weighting agent was adjusted according to the desired density of the sample fluids. Each sample contained ESCAID™ 110 hydrocarbon commercially available from Exxon Mobil, a BDF-364 emulsifier commercially available from Halliburton Energy Services, Inc., EZMUL® NT co-emulsifier (partial amide of polyamine and fatty acid in kerosene solvent commercially available from Diversity Technologies Corp.), HA 1281 co-surfactant commercially available from OLEO Chemicals, ADAPTA™ filtration reducer, GELTONE® V organophilic clay, BARACARB® bridging agent and LIQUITONE™, a polymeric filtration control agent, all commercially available from Halliburton Energy Services, Inc. Table 4 illustrates the amounts, in pounds, of the components in each sample. Also included in each sample was 8 pounds per barrel of ("lb/bbl") DURATONE® E filtration control agent commercially available from Halliburton Energy Services, Inc., and 2 lb/bbl of calcium hydroxide (lime). Each sample was hot rolled at 250° F. for 16 hours.

Table 5 shows the viscosity of each sample fluid at various shear rates (in rotations per minute or rpm's), measured with a Fann 35 rheometer at 50° C., the plastic viscosity in centipoise (cp), the yield point, the 10-second gel strength, and the 10-minute gel strength. Table 5 also includes the result of a high-temperature, high-pressure ("HPHT") filtration test at 250° F. and 500 psi. Filtration was measured with a saturated API HPHT fluid loss cell. The tests were performed in accordance with American Petroleum Institute Recommended Practice 13B-2, 3$^{rd}$ Edition, February 1998.

TABLE 4

| | ESCAID 110 | EZMUL NT | BDF-364 | HA 1281 | 250,000 ppm CaCl₂ | GEL TONE V | PPT Barite | API Barite | BARA CARB 50 | LIQUI TONE | ADAPTA | OWR |
|---|---|---|---|---|---|---|---|---|---|---|---|---|
| 8 | 128.97 | 0 | 8 | 1.6 | 153.44 | 6 | 110.96 | 0 | 40 | 3 | 0 | 60/40 |
| 9 | 129.92 | 8 | 0 | 0 | 153.33 | 6 | 111.69 | 0 | 40 | 3 | 0 | 60/40 |
| 10 | 130.31 | 0 | 8 | 1.6 | 154.94 | 3 | 112.70 | 0 | 40 | 1.5 | 0 | 60/40 |
| 11 | 131.26 | 8 | 0 | 0 | 154.82 | 3 | 113.34 | 0 | 40 | 1.5 | 0 | 60/40 |
| 12 | 130.55 | 0 | 8 | 1.6 | 155.21 | 3 | 112.70 | 0 | 40 | 1 | 0 | 60/40 |
| 13 | 133.71 | 0 | 8 | 1.6 | 158.76 | 3 | 102.15 | 43.78 | 0 | 1 | 0 | 60/40 |
| 14 | 151.15 | 8 | 0 | 0 | 113.89 | 5 | 128.91 | 0 | 40 | 0 | 5 | 70/30 |
| 15 | 152.68 | 8 | 0 | 0 | 114.99 | 5 | 129.27 | 0 | 40 | 0 | 2 | 70/30 |
| 16 | 156.39 | 8 | 0 | 0 | 117.68 | 5 | 114.07 | 48.89 | 0 | 0 | 2 | 70/30 |

TABLE 5

| | Viscosity at Various Shear Rates (rpm of agitation): Dial readings of "Fann Units" for: | | | | | | Plastic Viscosity mPa·s | Yield Point lb/100 ft² (Pascals) | Filtration mL | Gel Strength (10 sec/ 10 min.) |
|---|---|---|---|---|---|---|---|---|---|---|
| | 600 rpm | 300 rpm | 200 rpm | 100 rpm | 6 rpm | 3 rpm | | | | |
| 8 | 196 | 126 | 97 | 63 | 15 | 11 | 70 | 56 | 1.6 | 11.5/15 |
| 9 | 180 | 126 | 104 | 79 | 35 | 31 | 54 | 72 | 2 | 31/33 |
| 10 | 116 | 69 | 52 | 33 | 7 | 5 | 47 | 22 | 2.2 | 6/7 |
| 11 | 128 | 85 | 69 | 50 | 19 | 16 | 43 | 42 | 3 | 17/19 |
| 12 | 72 | 40 | 29 | 17 | 3 | 2.5 | 32 | 8 | 3.6 | 3/4 |
| 13 | 64 | 36 | 26 | 15 | 3.5 | 2.5 | 28 | 8 | 3 | 3/4 |
| 14 | 97 | 63 | 51 | 36 | 14 | 12 | 34 | 29 | 1.6 | 12/13 |
| 15 | 63 | 40 | 32 | 23 | 10 | 8.5 | 23 | 17 | 2.3 | 9/10 |
| 16 | 58 | 38 | 30 | 21 | 8 | 7 | 20 | 18 | 2 | 7/8 |

From the above example, it can be seen that the drilling fluids of the present invention comprising sub-micron precipitated barite possess desirable properties.

Example 5

For this series of tests, several 14 lb/gal oil-based drilling fluids were prepared using precipitated barite. The fluid density was obtained from a standard analytical balance. The fluids were mixed with a Hamilton Beach multi-mixer over a 1-hour period. An internal brine phase (250,000 ppm calcium chloride) was emulsified into a continuous oil phase. The oil-to-water ratio ("OWR") in the sample fluids is indicated in the table below. The amount of the weighting agent was adjusted according to the desired density of the sample fluids. Each sample contained ESCAID™ 110 hydrocarbon commercially available from Exxon Mobil, a BDF-364 emulsifier commercially available from Halliburton Energy Services, Inc., EZMUL® NT co-emulsifier (partial amide of polyamine and fatty acid in kerosene solvent commercially available from Diversity Technologies Corp.), HA 1281 co-surfactant commercially available from OLEO Chemicals, BARACARB® bridging agent and BDF-454, a polymeric filtration control agent, both commercially available from Halliburton Energy Services, Inc. Table 6 illustrates the amounts, in pounds, of the components in each sample. Also included in each sample was 8 pounds per barrel of ("lb/bbl") DURATONE® E filtration control agent, commercially available from Halliburton Energy Services, Inc. Each sample was hot rolled at 300° F. for 16 hours.

Table 7 shows the viscosity of each sample fluid at various shear rates (in rotations per minute or rpm's), measured with a Farm 35 rheometer at 50° C., the plastic viscosity in centipoise (cp), the yield point, the 10-second gel strength, and the 10-minute gel strength. Table 7 also includes the result of a high-temperature, high-pressure ("HPHT") filtration test at 250° F. and 500 psi. Filtration was measured with a saturated API HPHT fluid loss cell. The tests were performed in accordance with American Petroleum Institute Recommended Practice 13B-2, $3^{rd}$ Edition, February 1998.

TABLE 6

|  | ESCAID 110 | EZ MUL NT | BDF-364 | HA 1281 | 250,000 ppm CaCl$_2$ | CaOH (Lime) | PPT Barite | BARA CARB 5 | BARA CARB 25 | BARA CARB 50 | BDF-454 | OWR |
|---|---|---|---|---|---|---|---|---|---|---|---|---|
| 17 | 154.88 | 15 | 0 | 0 | 49.72 | 2 | 313.39 | 0 | 0 | 40 | 5 | 85/15 |
| 18 | 153.09 | 0 | 15 | 3 | 49.79 | 2 | 312.20 | 0 | 0 | 40 | 5 | 85/15 |
| 19 | 148.99 | 15 | 0 | 0 | 47.96 | 3 | 278.05 | 0 | 40 | 40 | 7 | 85/15 |
| 20 | 147.21 | 0 | 15 | 3 | 48.02 | 3 | 276.76 | 0 | 40 | 40 | 7 | 85/15 |
| 21 | 147.21 | 0 | 15 | 3 | 48.02 | 3 | 276.76 | 40 | 40 | 0 | 7 | 85/15 |
| 22 | 148.99 | 15 | 0 | 3 | 47.96 | 3 | 278.05 | 40 | 40 | 0 | 7 | 85/15 |

TABLE 7

|  | Viscosity at Various Shear Rates (rpm of agitation): Dial readings of "Fann Units" for: | | | | | | Plastic Viscosity mPa·s | Yield Point lb/100 ft$^2$ (Pascals) | Filtration mL | Gel Strength (10 sec/ 10 min.) |
|---|---|---|---|---|---|---|---|---|---|---|
|  | 600 rpm | 300 rpm | 200 rpm | 100 rpm | 6 rpm | 3 rpm | | | | |
| 17 | 67 | 43 | 35 | 25 | 9 | 8 | 24 | 19 | 19.6 | 8/10 |
| 18 | 113 | 69 | 53 | 34 | 10 | 8 | 44 | 25 | 14 | 8/14 |
| 19 | 78 | 49 | 39 | 27 | 10 | 8 | 29 | 20 | 11.6 | 8/11 |
| 20 | 91 | 53 | 40 | 25 | 6 | 5 | 38 | 15 | 8 | 6/7 |
| 21 | 92 | 54 | 40 | 25 | 6.5 | 5.0 | 38 | 16 | 8.8 | 6/7 |
| 22 | 78 | 50 | 40 | 28 | 10 | 8 | 28 | 22 | 12 | 8/12 |

From the above example, it can be seen that the drilling fluids of the present invention comprising sub-micron precipitated barite possess desirable properties.

Example 6

For this series of tests, several 14 lb/gal oil-based drilling fluids were prepared using precipitated barite. The fluid density was obtained from a standard analytical balance. The fluids were mixed with a Hamilton Beach multi-mixer over a 1-hour period. An internal brine phase (250,000 ppm calcium chloride) was emulsified into a continuous oil phase. The oil-to-water ratio ("OWR") in the sample fluids is indicated in the table below. The amount of the weighting agent was adjusted according to the desired density of the sample fluids. Each sample contained ESCAID™ 110 hydrocarbon commercially available from Exxon Mobil, a BDF-364 emulsifier commercially available from Halliburton Energy Services, Inc., EZMUL® NT co-emulsifier (partial amide of polyamine and fatty acid in kerosene solvent commercially available from Diversity Technologies Corp.), HA 1281 co-surfactant commercially available from OLEO Chemicals, ADAPTA™ filtration reducer, GELTONE® V organophilic clay, BARACARB® bridging agent and LIQUITONE™, a polymeric filtration control agent, all commercially available from Halliburton Energy Services, Inc. Table 8 illustrates the amounts, in pounds, of the components in each sample. Also included in each sample was 8 pounds per barrel of ("lb/bbl") DURATONE® E filtration control agent, which is commercially available from Halliburton Energy Services, Inc., and 2 lb/bbl of calcium hydroxide (lime). Each sample was hot rolled at 300° F. for 16 hours.

Table 9 shows the viscosity of each sample fluid at various shear rates (in rotations per minute or rpm's), measured with a Fann 35 rheometer at 50° C., the plastic viscosity in centipoise (cp), the yield point, the 10-second gel strength, and the 10-minute gel strength. Table 9 also includes the result of a high-temperature, high-pressure ("HPHT") filtration test at 250° F. and 500 psi. Filtration was measured with a saturated API HPHT fluid loss cell. The tests were performed in accordance with American Petroleum Institute Recommended Practice 13B-2, $3^{rd}$ Edition, February 1998.

TABLE 8

|    | ESCAID 110 | EZMUL NT | BDF-364 | HA 1281 | 250,000 ppm $CaCl_2$ | GEL TONE V | PPT Barite | BARA CARB 50 | ADAPTA | OWR |
|----|--------|-------|------|------|--------|------|--------|-----|------|-------|
| 23 | 125.30 | 0  | 10 | 2 | 97.36 | 3   | 256.44 | 80  | 4   | 70/30 |
| 24 | 126.65 | 0  | 10 | 2 | 98.34 | 1.5 | 257.45 | 80  | 2   | 70/30 |
| 25 | 145.29 | 0  | 10 | 2 | 65.22 | 1.5 | 272.00 | 80  | 2   | 80/20 |
| 26 | 126.89 | 0  | 10 | 2 | 98.51 | 1.5 | 257.54 | 80  | 1.5 | 70/30 |
| 27 | 145.00 | 0  | 10 | 2 | 65.09 | 2.5 | 271.36 | 80  | 2   | 80/20 |
| 28 | 127.87 | 10 | 0  | 0 | 98.27 | 1.5 | 258.36 | 80  | 2   | 70/30 |
| 29 | 125.98 | 10 | 0  | 0 | 96.91 | 1.5 | 241.61 | 100 | 2   | 70/30 |
| 30 | 126.12 | 10 | 0  | 0 | 97.00 | 1.5 | 239.32 | 100 | 0   | 70/30 |
| 31 | 126.74 | 10 | 0  | 0 | 97.45 | 1.5 | 246.28 | 100 | 4   | 70/30 |

TABLE 9

|    | Viscosity at Various Shear Rates (rpm of agitation): Dial readings of "Fann Units" for: | | | | | | Plastic Viscosity mPa·s | Yield Point lb/100 ft² (Pascals) | Filtration mL | Gel Strength (10 sec/10 min.) |
|----|---------|---------|---------|---------|-------|-------|------|-----|------|--------|
|    | 600 rpm | 300 rpm | 200 rpm | 100 rpm | 6 rpm | 3 rpm |      |     |      |        |
| 23 | 298 | 188 | 144 | 94 | 25 | 20  | 110 | 78 | 2.5  | 20/23   |
| 24 | 173 | 100 | 75  | 46 | 10 | 8   | 73  | 27 | 5.6  | 8/10    |
| 25 | 77  | 44  | 32  | 19 | 5  | 4   | 33  | 11 | 10.6 | 5/6     |
| 26 | 128 | 75  | 56  | 34 | 7  | 5   | 53  | 22 | 2.6  | 6/8     |
| 27 | 115 | 67  | 50  | 31 | 7  | 5.5 | 48  | 49 | 7.4  | 6/9     |
| 28 | 103 | 63  | 50  | 32 | 12 | 9.5 | 40  | 23 | 11.6 | 10/13   |
| 29 | 102 | 64  | 49  | 33 | 11 | 9.5 | 38  | 26 | 5.8  | 9.5/12  |
| 30 | 90  | 57  | 45  | 32 | 11 | 9   | 33  | 24 | 5    | 9.5/12  |
| 31 | 115 | 69  | 53  | 35 | 11 | 9   | 46  | 23 | 6.6  | 9/11    |

From the above example, it can be seen that the drilling fluids of the present invention comprising sub-micron precipitated barite possess desirable properties.

Example 7

For this series of tests, several 16 lb/gal oil-based drilling fluids were prepared using precipitated barite. The fluid density was obtained from a standard analytical balance. The fluids were mixed with a Hamilton Beach multi-mixer over a 1-hour period. An internal brine phase (250,000 ppm calcium chloride) was emulsified into a continuous oil phase. The oil-to-water ratio ("OWR") in the sample fluids is indicated in the table below. The amount of the weighting agent was adjusted according to the desired density of the sample fluids. Each sample contained ESCAID™ 110 hydrocarbon commercially available from Exxon Mobil, a BDF-364 emulsifier commercially available from Halliburton Energy Services, Inc., EZMUL® NT co-emulsifier (partial amide of polyamine and fatty acid in kerosene solvent commercially available from Diversity Technologies Corp.), HA 1281 co-surfactant commercially available from OLEO Chemicals, BDF-454 polymeric filtration control agent, OMC® 2 an oligomeric fatty acid oil mud conditioner, OMC® 42 a polyimide surfactant oil mud conditioner, GELTONE® V organophilic clay, and BARACARB® bridging agent, all commercially available from Halliburton Energy Services, Inc. Table 10 illustrates the amounts, in pounds, of the components in each sample. Also included in each sample was 8 pounds per barrel of ("lb/bbl") DURATONE® E filtration control agent, which is commercially available from Halliburton Energy Services, Inc. Each sample was hot rolled at 350° F. for 16 hours.

Table 11 shows the viscosity of each sample fluid at various shear rates (in rotations per minute or rpm's), measured with a Fann 35 rheometer at 50° C., the plastic viscosity in centipoise (cp), the yield point, the 10-second gel strength, and the 10-minute gel strength. Table 11 also includes the result of a high-temperature, high-pressure ("HPHT") filtration test at 250° F. and 500 psi. Filtration was measured with a saturated API HPHT fluid loss cell. The tests were performed in accordance with American Petroleum Institute Recommended Practice 13B-2, $3^{rd}$ Edition, February 1998.

TABLE 10

|    | ESCAID 110 | EZ MUL | OMC 2 | OMC 42 | BDF-364 | HA 1281 | 250,000 ppm $CaCl_2$ | CaOH Lime | PPT Barite | BARA CARB 25 | BARA CARB 50 | BARA CARB 5 | BDF-454 | OWR |
|----|------------|--------|-------|--------|---------|---------|----------------------|-----------|------------|--------------|--------------|-------------|---------|-----|
| 32 | 137.42 | 15 | 0.8 | 0 | 0 | 0 | 44.53 | 2 | 410.07 | 0 | 50 | 0 | 5 | 85/15 |
| 33 | 136.77 | 15 | 0 | 2 | 0 | 0 | 44.54 | 2 | 409.97 | 0 | 50 | 0 | 5 | 85/15 |
| 34 | 131.95 | 15 | 0 | 1 | 0 | 0 | 43.16 | 2 | 383.79 | 40 | 40 | 0 | 7 | 85/15 |
| 35 | 126.48 | 15 | 0 | 2 | 0 | 0 | 41.78 | 3 | 348.82 | 60 | 0 | 60 | 7 | 85/15 |
| 36 | 126.21 | 0 | 0 | 0 | 15 | 3 | 41.78 | 4 | 346.99 | 60 | 0 | 60 | 7 | 85/15 |

TABLE 11

|    | Viscosity at Various Shear Rates (rpm of agitation): Dial readings of "Fann Units" for: | | | | | | Plastic Viscosity mPa·s | Yield Point lb/100 ft² (Pascals) | Filtration mL | Gel Strength (10 sec/10 min.) |
|----|-----|-----|-----|-----|---|---|---|---|---|---|
|    | 600 rpm | 300 rpm | 200 rpm | 100 rpm | 6 rpm | 3 rpm | | | | |
| 32 | 100 | 56 | 41 | 25 | 6 | 5 | 44 | 12 | 19 | 6/8 |
| 33 | 85 | 49 | 36 | 21 | 4 | 3 | 36 | 13 | 29 | 4/7 |
| 34 | 153 | 97 | 76 | 50 | 14 | 12 | 56 | 41 | 12.4 | 12/23 |
| 35 | 143 | 86 | 65 | 39 | 7 | 5 | 57 | 29 | 16.2 | 7/12 |
| 36 | 190 | 115 | 88 | 55 | 16 | 13 | 75 | 40 | 13.6 | 12/17 |

From the above example, it can be seen that the drilling fluids of the present invention comprising sub-micron precipitated barite possess desirable properties.

Example 8

For this series of tests, several 16 lb/gal oil-based drilling fluids were prepared using precipitated barite. The fluid density was obtained from a standard analytical balance. The fluids were mixed with a Hamilton Beach multi-mixer over a 1-hour period. An internal brine phase (250,000 ppm calcium chloride) was emulsified into a continuous oil phase. The oil-to-water ratio ("OWR") in the sample fluids is indicated in the table below. The amount of the weighting agent was adjusted according to the desired density of the sample fluids. Each sample contained ESCAID™ 110 hydrocarbon commercially available from Exxon Mobil, EZMUL® NT co-emulsifier (partial amide of polyamine and fatty acid in kerosene solvent commercially available from Diversity Technologies Corp.), OMC® 2 an oligomeric fatty acid oil mud conditioner, ADAPTA™ filtration reducer, GEL-TONE® V organophilic clay, and BARACARB® bridging agent, all commercially available from Halliburton Energy Services, Inc. Table 12 illustrates the amounts, in pounds, of the components in each sample. Also included in each sample was 8 pounds per barrel of ("lb/bbl") DURATONE® E filtration control agent, which is commercially available from Halliburton Energy Services, Inc. and 2 lb/bbl of calcium hydroxide (lime). Samples 37-41 were hot rolled at 250° F. for 16 hours and samples 42-43 were hot rolled at 350° F. for 16 hours.

Table 13 shows the viscosity of each sample fluid at various shear rates (in rotations per minute or rpm's), measured with a Fann 35 rheometer at 50° C., the plastic viscosity in centipoise (cp), the yield point, the 10-second gel strength, and the 10-minute gel strength. Table 13 also includes the result of a high-temperature, high-pressure ("HPHT") filtration test conducted at 250° F. and 500 psi for samples 37-41 and at 350° F. and 500 psi for samples 42-43. Filtration was measured with a saturated API HPHT fluid loss cell. The tests were performed in accordance with American Petroleum Institute Recommended Practice 13B-2, $3^{rd}$ Edition, February 1998.

TABLE 12

|    | ESCAID 110 | EZMUL NT | OMC 2 | 250,000 ppm $CaCl_2$ | GEL TONE V | PPT Barite | BARA CARB 50 | ADAPTA | OWR |
|----|------------|----------|-------|----------------------|------------|------------|--------------|--------|-----|
| 37 | 131.87     | 15       | 1.5   | 43.27                | 3          | 382.42     | 80           | 5      | 85/15 |
| 38 | 130.97     | 15       | 2     | 43.14                | 4.5        | 381.41     | 80           | 5      | 85/15 |
| 39 | 132.35     | 15       | 2     | 43.55                | 6          | 381.04     | 80           | 2      | 85/15 |
| 40 | 132.29     | 15       | 1     | 43.26                | 3          | 382.51     | 80           | 5      | 85/15 |
| 41 | 130.04     | 15       | 1.5   | 42.72                | 3          | 381.77     | 80           | 8      | 85/15 |
| 42 | 130.92     | 15       | 1.5   | 42.99                | 3          | 382.60     | 80           | 7      | 85/15 |
| 43 | 129.88     | 15       | 2     | 42.82                | 3          | 382.32     | 80           | 8      | 85/15 |

TABLE 13

|    | Viscosity at Various Shear Rates (rpm of agitation): Dial readings of "Fann Units" for: |||||| Plastic Viscosity mPa·s | Yield Point lb/100 ft² (Pascals) | Filtration mL | Gel Strength (10 sec/10 min.) |
|----|---------|---------|---------|---------|-------|-----|----------|--------|------|------|
|    | 600 rpm | 300 rpm | 200 rpm | 100 rpm | 6 rpm | 3 rpm |        |          |        |      |
| 37 | 139 | 78  | 56   | 32.5 | 6    | 4.5 | 31 | 17 | 12   | 5/6.5 |
| 38 | 193 | 109 | 78   | 45   | 8.5  | 6.5 | 84 | 25 | 12   | 7/8 |
| 39 | 184 | 103 | 74   | 42   | 7    | 5   | 81 | 22 | 23.6 | 6/7 |
| 40 | 158 | 91  | 67   | 41   | 9.5  | 7.5 | 67 | 24 | 14.2 | 8/10 |
| 41 | 220 | 127 | 93   | 56   | 12   | 9.5 | 93 | 34 | 8    | 10/11 |
| 42 | 189 | 108 | 78.5 | 46.5 | 9    | 7   | 81 | 27 | 9.4  | 8/10 |
| 43 | 233 | 134 | 98   | 58   | 11.5 | 9   | 99 | 35 | 11   | 9/10 |

From the above example, it can be seen that the drilling fluids of the present invention comprising sub-micron precipitated barite possess desirable properties.

Example 10

For this series of tests, several oil-based drilling fluids were prepared using precipitated barite. The fluid density was obtained from a standard analytical balance. The fluids were mixed with a Hamilton Beach multi-mixer over a 1-hour period. An internal brine phase (250,000 ppm calcium chloride) was emulsified into a continuous oil phase. The oil-to-water ratio ("OWR") in the sample fluids is indicated in the table below. The amount of the weighting agent was adjusted according to the desired density of the sample fluids. Each sample contained XP-07 hydrocarbon commercially available from Exxon Mobil Corp., EZMUL® NT co-emulsifier (partial amide of polyamine and fatty acid in kerosene solvent commercially available from Diversity Technologies Corp.), ADAPTA™ filtration reducer, GELTONE® V organophilic clay, and BARACARB® bridging agent, all commercially available from Halliburton Energy Services, Inc. Table 14 illustrates the amounts, in pounds, of the components in each sample. Also included in each sample was 8 pounds per barrel of ("lb/bbl") DURATONE® E filtration control agent, which is commercially available from Halliburton Energy Services, Inc. and 2 lb/bbl of calcium hydroxide (lime). Sample 44 was hot rolled at 250° F. for 16 hours, sample 45 was hot rolled at 300° F. for 16 hours, and sample 46 was hot rolled for 350° F. for 16 hours.

Table 15 shows the viscosity of each sample fluid at various shear rates (in rotations per minute or rpm's), measured with a Fann 35 rheometer at 50° C., the plastic viscosity in centipoise (cp), the yield point, the 10-second gel strength, and the 10-minute gel strength. Table 15 also includes the result of a high-temperature, high-pressure ("HPHT") filtration test conducted at 250° F. and 500 psi for sample 44, 300° F. and 500 psi for sample 45, and 350° F. and 500 psi for sample 46. Filtration was measured with a saturated API HPHT fluid loss cell. The tests were performed in accordance with American Petroleum Institute Recommended Practice 13B-2, 3$^{rd}$ Edition, February 1998.

From the above example, it can be seen that the drilling fluids of the present invention comprising sub-micron precipitated barite possess desirable properties.

Example 11

For this series of tests, several 16 lb/gal oil-based drilling fluids were prepared using precipitated barite. The fluid density was obtained from a standard analytical balance. The fluids were mixed with a Hamilton Beach multi-mixer over a 1-hour period. An internal brine phase (250,000 ppm calcium chloride) was emulsified into a continuous oil phase. The oil-to-water ratio ("OWR") in the sample fluids is indicated in the table below. The amount of the weighting agent was adjusted according to the desired density of the sample fluids. Each sample contained ESCAID™ 110 hydrocarbon commercially available from Exxon Mobil, EZMUL® NT co-emulsifier (partial amide of polyamine and fatty acid in kerosene solvent commercially available from Diversity Technologies Corp.), BDF-454 polymeric filtration control agent, OMC® 2 an oligomeric fatty acid oil mud conditioner, ADAPTA™ filtration reducer, GELTONE® V organophilic clay, and BARACARB® bridging agent. Table 16 illustrates the amounts, in pounds, of the components in each sample. Also included in each sample was 8 pounds per barrel of ("lb/bbl") DURATONE® E filtration control agent, which is commercially available from Halliburton Energy Services, Inc. and 2 lb/bbl of calcium hydroxide (lime). Each sample was hot rolled at 350° F. for 16 hours.

Table 17 shows the viscosity of each sample fluid at various shear rates (in rotations per minute or rpm's), measured with a Fann 35 rheometer at 50° C., the plastic viscosity in centipoise (cp), the yield point, the 10-second gel strength, and the 10-minute gel strength. Table 17 also includes the result of a high-temperature, high-pressure ("HPHT") filtration test and sag index after static aging at 250° F. for 72 hours. Filtration was measured with a saturated API HPHT fluid loss cell. The sag index was calculated from $D_b/2D_m$, where $D_b$ is the density of the bottom third of the particular sample fluid after static aging and $D_m$ is the density of the original fluid. A lower sag index indicates better fluid stability against particle sedimentation.

TABLE 14

| | XP-07 | EZMUL NT | OMC 2 | 250,000 ppm CaCl$_2$ | GEL TONE V | PPT Barite | BARA CARB 50 | ADAPTA | Density (lb/gal) | OWR |
|---|---|---|---|---|---|---|---|---|---|---|
| 44 | 148.22 | 8 | 0 | 114.56 | 5 | 134.22 | 40 | 2 | 11 | 70/30 |
| 45 | 122.28 | 10 | 0 | 96.53 | 1.5 | 245.64 | 100 | 2 | 14 | 70/30 |
| 46 | 126.08 | 15 | 1.5 | 42.53 | 3 | 385.80 | 80 | 8 | 16 | 85/15 |

TABLE 15

| | Viscosity at Various Shear Rates (rpm of agitation): Dial readings of "Fann Units" for: | | | | | | Plastic Viscosity mPa · s | Yield Point lb/100 ft$^2$ (Pascals) | Filtration mL | Gel Strength (10 sec/ 10 min.) |
|---|---|---|---|---|---|---|---|---|---|---|
| | 600 rpm | 300 rpm | 200 rpm | 100 rpm | 6 rpm | 3 rpm | | | | |
| 44 | 58 | 39 | 32 | 23 | 10 | 9 | 19 | 20 | 3.4 | 9/10 |
| 45 | 102 | 69 | 56 | 41 | 17 | 15 | 33 | 36 | 9.4 | 15/16 |
| 46 | 178 | 104 | 76 | 47 | 13 | 10 | 74 | 30 | 15.8 | 11/13 |

TABLE 16

| | ESCAID 110 | EZMUL NT | OMC 2 | BDF-454 | 250,000 ppm CaCl$_2$ | GEL TONE V | PPT Barite | BARA CARB 50 | ADAPTA | OWR |
|---|---|---|---|---|---|---|---|---|---|---|
| 47 | 130.92 | 15 | 1.5 | 0 | 42.99 | 3 | 382.60 | 80 | 7 | 85/15 |
| 48 | 130.92 | 15 | 1.5 | 7 | 42.99 | 3 | 382.60 | 80 | 0 | 85/15 |

TABLE 17

| | Viscosity at Various Shear Rates (rpm of agitation): Dial readings of "Fann Units" for: | | | | | | Plastic | Yield Point | | | Gel Strength |
|---|---|---|---|---|---|---|---|---|---|---|---|
| | 600 rpm | 300 rpm | 200 rpm | 100 rpm | 6 rpm | 3 rpm | Viscosity mPa·s | lb/100 ft$^2$ (Pascals) | Sag Index | Filtration mL | (10 sec/ 10 min.) |
| 47 | 280 | 172 | 130 | 85 | 27 | 22 | 108 | 64 | 0.5 | 14.6 | 23/31 |
| 48 | 214 | 130 | 99 | 64 | 21 | 18 | 84 | 46 | 0.5 | 14.4 | 19/32 |

From the above example, it can be seen that the drilling fluids of the present invention comprising sub-micron precipitated barite possess desirable properties.

Example 12

For this series of tests, several 11 lb/gal oil-based drilling fluids were prepared using precipitated barite. The fluid density was obtained from a standard analytical balance. The fluids were mixed with a Hamilton Beach multi-mixer over a 1-hour period. An internal brine phase (250,000 ppm calcium chloride) was emulsified into a continuous oil phase. The oil-to-water ratio ("OWR") in the sample fluids is indicated in the table below. The amount of the weighting agent was adjusted according to the desired density of the sample fluids. Each sample contained ESCAID™ 110 hydrocarbon commercially available from Exxon Mobil, EZMUL® NT coemulsifier (partial amide of polyamine and fatty acid in kerosene solvent commercially available from Diversity Technologies Corp.), BDF-454 polymeric filtration control agent, OMC® 2 an oligomeric fatty acid oil mud conditioner, ADAPTA™ filtration reducer, GELTONE® V organophilic clay, and BARACARB® bridging agent. Table 18 illustrates the amounts, in pounds, of the components in each sample. Also included in each sample was 8 pounds per barrel of ("lb/bbl") DURATONE® E filtration control agent, which is commercially available from Halliburton Energy Services, Inc. and 2 lb/bbl of calcium hydroxide (lime). Each sample was hot rolled at 250° F. for 16 hours.

Table 19 shows the viscosity of each sample fluid at various shear rates (in rotations per minute or rpm's), measured with a Fann 35 rheometer at 50° C., the plastic viscosity in centipoise (cp), the yield point, the 10-second gel strength, and the 10-minute gel strength. Table 19 also includes the result of a high-temperature, high-pressure ("HPHT") filtration test and sag index after static aging at 250° F. for 72 hours. Filtration was measured with a saturated API HPHT fluid loss cell. The sag index was calculated from $D_b/2D_m$, where $D_b$ is the density of the bottom third of the particular sample fluid after static aging and $D_m$ is the density of the original fluid. A lower sag index indicates better fluid stability against particle sedimentation.

TABLE 18

| | ESCAID 110 | EZMUL NT | BDF-364 | HA 1281 | 250,000 ppm CaCl$_2$ | GEL TONE V | LIQUI TONE | PPT Barite | BARA CARB 50 | ADAPTA | OWR |
|---|---|---|---|---|---|---|---|---|---|---|---|
| 49 | 130.55 | 0 | 8 | 1.6 | 155.21 | 3 | 1 | 112.70 | 40 | 0 | 60/40 |
| 50 | 152.68 | 8 | 0 | 0 | 114.99 | 5 | 0 | 129.27 | 40 | 2 | 70/30 |

TABLE 19

| | Viscosity at Various Shear Rates (rpm of agitation): Dial readings of "Fann Units" for: | | | | | | Plastic | Yield Point | | | Gel Strength |
|---|---|---|---|---|---|---|---|---|---|---|---|
| | 600 rpm | 300 rpm | 200 rpm | 100 rpm | 6 rpm | 3 rpm | Viscosity mPa·s | (Pascals) lb/100 ft$^2$ | Sag Index | Filtration mL | (10 sec/ 10 min.) |
| 49 | 72 | 41 | 29 | 17 | 3.5 | 2.5 | 31 | 10 | 0.54 | 1.6 | 3/4 |
| 50 | 63 | 39 | 31 | 28 | 8 | 7 | 24 | 15 | 0.52 | 2.4 | 7/9 |

From the above example, it can be seen that the drilling fluids of the present invention comprising sub-micron precipitated barite possess desirable properties.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. A drilling fluid comprising:
    a carrier fluid;
    a weighting agent that comprises sub-micron precipitated barite having a particle size distribution such that at least 10% of particles in the sub-micron precipitated barite have a diameter below about 0.2 microns, at least 50% of the particles in the sub-micron precipitated barite have a diameter below about 0.3 microns and at least 90% of the particles in the sub-micron precipitated barite have a diameter below about 0.5 microns;
    a particle having a specific gravity of greater than about 2.6,
        wherein the particle having a specific gravity of greater than about 2.6 is not sub-micron precipitated barite;
        wherein the ratio of the sub-micron precipitated barite to the particle is about 10:90 to about 99:1; and
    a bridging agent that is not the submicron-precipitated barite or the particle, wherein the bridging agent comprises at least one degradable material selected from the group consisting of montanyl alcohol, tert-butylhydroquinone, cholesteryl nonanoate, benzoin, exo-norborneol, glyceraldehyde triphenylmethanol, propyl gallate, dimethyl terephthalate, cholecalciferol, ricinoleyl alcohol, 1-heptacosanol, 1-tetratriacontanol, 1-dotriacontanol, 1-hentriacontanol, 1-tricontanol, 1-nonacosanol, 1-octasanol, 1-hexacosanol, 1,14-tetradecanediol, 1,16-hexadecanediol, 1,17-heptadecanediol, 1,18-octadecanediol, 1,19-nonadecanediol, 1,20-eicosanediol, 1,21-heneicosanediol, 1,22-docosanediol, sucrose distearate, glyceryl monostearate, and any combination thereof.

2. The drilling fluid of claim 1 wherein the drilling fluid has a density of greater than about 9 pounds per gallon.

3. The drilling fluid of claim 1 wherein the carrier fluid comprises at least one fluid selected from the group consisting of an aqueous-based fluid and an oleaginous-based fluid.

4. The drilling fluid of claim 1 wherein the weighting agent is present in the drilling fluid in an amount of about 5% to about 70% by volume of the drilling fluid.

5. The drilling fluid of claim 1 wherein the drilling fluid comprises at least one additive selected from the group consisting of a viscosifying agent, a shale inhibitor, a pH-control agent, an emulsifier, a filtration-control agent, calcium hydroxide, and a salt.

6. The drilling fluid of claim 1 wherein the drilling fluid is essentially free of viscosifying agent.

7. The drilling fluid of claim 1 wherein the particle comprises at least one selected from a group consisting of manganese tetraoxide, barite, hematite, ilmenite, galena, calcium carbonate, and any combination thereof.

8. The drilling fluid of claim 1 wherein the degradable bridging agent is self-degradable.

9. The drilling fluid of claim 1 wherein the degradable bridging agent is degradable in a cleanup-solution.

10. The drilling fluid of claim 1 wherein the degradable bridging agent has a size of about 1 micron to about 200 microns.

11. The drilling fluid of claim 1 wherein the degradable bridging agent is present in the drilling fluid in an amount up to about 200 pounds per barrel.

12. The drilling fluid of claim 1 wherein the carrier fluid has an oil-to-water ratio of 60/40 to 85/15.

13. A drilling fluid comprising:
    a foamed aqueous carrier fluid;
    a weighting agent that comprises sub-micron precipitated barite having a particle size distribution such that at least 10% of particles in the sub-micron precipitated barite have a diameter below about 0.2 microns, at least 50% of the particles in the sub-micron precipitated barite have a diameter below about 0.3 microns and at least 90% of the particles in the sub-micron precipitated barite have a diameter below about 0.5 microns;
    a particle having a specific gravity of greater than about 2.6, wherein the particle having a specific gravity of greater than about 2.6 is not sub-micron precipitated barite;
        wherein the ratio of the sub-micron precipitated barite to the particle is about 10:90 to about 99:1; and
    a bridging agent that is not the submicron-precipitated barite or the particle, wherein the bridging agent comprises at least one degradable material selected from the group consisting of montanyl alcohol, tert-butylhydroquinone, cholesteryl nonanoate, benzoin, exo-norborneol, glyceraldehyde triphenylmethanol, propyl gallate, dimethyl terephthalate, cholecalciferol, ricinoleyl alcohol, 1-heptacosanol, 1-tetratriacontanol, 1-dotriacontanol, 1-hentriacontanol, 1-tricontanol, 1-nonacosanol, 1-octasanol, 1-hexacosanol, 1,14-tetradecanediol, 1,16-hexadecanediol, 1,17-heptadecanediol, 1,18-octadecanediol, 1,19-nonadecanediol, 1,20-eicosanediol, 1,21-heneicosanediol, 1,22-docosanediol, sucrose distearate, glyceryl monostearate, and any combination thereof.

14. The drilling fluid of claim 13 wherein the bridging agent is self-degradable.

15. The drilling fluid of claim 13 wherein the bridging agent is degradable in a cleanup-solution.

16. The drilling fluid of claim 13 wherein the bridging agent has a size of about 1 micron to about 200 microns.

17. The drilling fluid of claim 13 wherein the bridging agent is present in the drilling fluid in an amount up to about 200 pounds per barrel.

18. The drilling fluid of claim 13 wherein the drilling fluid has a density of greater than about 9 pounds per gallon.

19. The drilling fluid of claim 13 wherein the weighting agent is present in the drilling fluid in an amount of about 5% to about 70% by volume of the drilling fluid.

20. The drilling fluid of 13 wherein the drilling fluid comprises at least one additive selected from the group consisting of a viscosifying agent, a shale inhibitor, a pH-control agent, an emulsifier, a filtration-control agent, calcium hydroxide, and a salt.

21. The drilling fluid of claim 13 wherein the drilling fluid is essentially free of viscosifying agent.

22. The drilling fluid of claim 13 wherein the particle comprises at least one selected from a group consisting of manganese tetraoxide, barite, hematite, ilmenite, galena, calcium carbonate, and any combination thereof.

23. The drilling fluid of claim 13 wherein the degradable bridging agent is self-degradable.

24. The drilling fluid of claim 13 wherein the degradable bridging agent is degradable in a cleanup-solution.

25. The drilling fluid of claim 13 wherein the degradable bridging agent has a size of about 1 micron to about 200 microns.

26. The drilling fluid of claim 13 wherein the degradable bridging agent is present in the drilling fluid in an amount up to about 200 pounds per barrel.

27. The drilling fluid of claim 13 wherein the carrier fluid has an oil-to-water ratio of 60/40 to 85/15.

* * * * *